United States Patent [19]

Windecker

[11] 3,761,734

[45] Sept. 25, 1973

[54] ELECTRONIC CONTROL SYSTEM

[75] Inventor: Roland T. Windecker, Richardson, Tex.

[73] Assignee: Texas Instruments Incorporated, Dallas, Tex.

[22] Filed: Sept. 9, 1971

[21] Appl. No.: 179,223

Related U.S. Application Data

[63] Continuation of Ser. No. 886,635, Dec. 19, 1969, abandoned.

[52] U.S. Cl. ................ 307/92, 307/252 B, 307/202

[51] Int. Cl. .............................................. H02h 7/20

[58] Field of Search ................ 307/252 B, 202, 243, 307/92; 317/16, 33, 148.5

[56] References Cited

UNITED STATES PATENTS

| | | | |
|---|---|---|---|
| 3,359,434 | 12/1967 | Galluzzi | 307/202 |
| 3,600,634 | 8/1971 | Muench, Jr. | 317/16 |

*Primary Examiner*—Herman J. Hohauser
*Attorney*—Harold Levine et al.

[57] ABSTRACT

An electronic system for effecting fail-safe operation of a selectively operable control system, including a selectively energizable switch which selectively couples the control system to a source of power for rendering the control system operative and inoperative. First and second power switches are connected between a source of power and the selectively energizable switch for supplying energizing and deenergizing signals to the selectively energizable switch to render the control system operative and inoperative respectively. A switch control means controls conduction of the power switches, and a current limiting device is serially connected between the source of power and the selectively energizable switc for disrupting the supply of power to the selectively energizable switch in order to render the control system inoperative, when the switch control means applies energizing signals to effect conduction of one of the power switches while the other power switch remains in an energized state in the absence of the application of a signal thereto causing energization thereof.

10 Claims, 2 Drawing Figures

Figure 1:
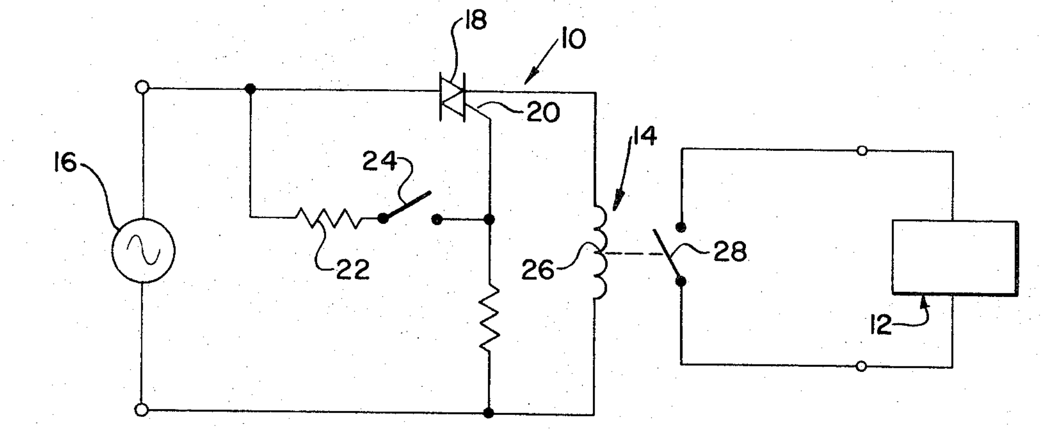
PRIOR ART FIG. 1

INVENTOR
ROLAND T. WINDECKER
BY
ATTORNEY

ELECTRONIC CONTROL SYSTEM

This is a continuation, of application Ser. No. 886,635, filed 12.19.69, now abandoned.

The present invention relates generally to an electronic system for operating a control system, and more particularly is directed to an electronic system for effecting fail-safe control of the operation of a brake control system.

In recent years numerous electrical circuits have been developed and used for effecting control of various types of mechanical control systems. Such electronic systems have proven to be particularly useful in connection with achieving on and off operation of such mechanical systems in view of the facility with which electronic systems can be designed for energizing and deenergizing systems, which control the operation of such mechanical systems. In this connection, various electronic systems have proven to be extremely useful in connection with the operation of certain brake control systems. where an extremely high degree of reliability must be achieved in operation of the brake control system. Such reliability is particularly urgent in applications involving the operation of heavy industrial equipment, including heavy duty cranes, hoists, etc., which are utilized for positioning relatively heavy loads of the order of thousands of pounds. In such circumstances, a failure in the brake control system could, of course, be disastrous in terms of loss of life and property and a simple, but effective, and fail-safe brake control system is an absolute necessity.

In order to achieve some measure of assurance of fail-safe operation of the brake control systems in such applications, electronic control circuits have been developed and coupled to the brake control system in a manner such that the brake is in a set position, when the brake control system is deenergized to prevent movement of the equipment in question and is released only in response to energization of the brake control system supplied by the electronic control system. Consequently, in the event of a failure in the electronic control system to operate the result is the inability to energize the brake control system and the brake remains in a set position so that the necessary repairs may be effected without any adverse consequences such as might result from inadvertent or undesired release of the brake. In addition, the active electronic control elements in this type of electronic control system ordinarily has a long electrical lifetime. Furthermore, the active element is often arranged in the circuit such that its failure to operate merely renders the system inoperable for purposes of energizing the brake control system so that release of the brake is unattainable and the brake remains in the set position until appropriate repairs are effected. Such an affect, of course, is highly desirable as distinguished from an arrangement in which setting of the brake is unattainable in the event of an inoperable active element. However, a remote possibility nevertheless exists that other failures of the active element may occur such as an internal short circuit, which may cause the electronic component to remain in an energized or conductive state even in the absence of an energizing signal so that it continues to supply a control signal to the brake control circuit to cause the brake to remain in a released state. Such an affect, of course, may be disastrous and even the remotest possibility of the brake remaining released must be avoided.

Accordingly, it is an object of the present invention to provide an improved electronic system for effecting fail-safe control of a brake control system.

It is another object of the present invention to provide an electronic system for operating a selectively operable brake control system in which inherently fail-safe operation is achieved as a result of the arrangement of the electronic control system.

It is still another object of the present invention to provide an electronic system for effecting fail-safe operation of a brake control system in which the brake may be maintained in a set position in the event of an electronic failure in the electronic system.

It is a further object of the present invention to provide an economical and durable electronic control system which effects fail-safe control of the operation of a brake control system by rendering the brake control system inoperative and effecting setting of the brake in the event of a failure in the electronic control system.

Figure 2:
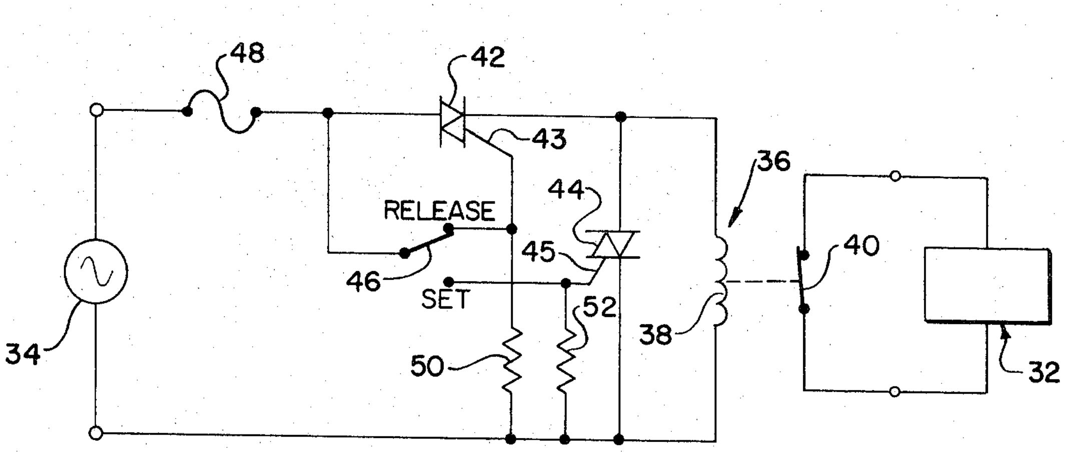

Various additional objects and advantages will become readily apparent from the following detailed description and accompanying drawings wherein:

FIG. 1 is an electrical schematic circuit diagram of a typical prior art electronic system for effecting control of a brake control system; and FIG. 2 is an electrical schematic circuit diagram of a preferred embodiment of an electronic system in accordance with the present invention.

Referring now to FIG. 1 which illustrates a typical prior art brake control system, such a system generally includes an electronic control system 10 which is coupled to a brake control system 12 through a switch 14 which renders the brake system 12 operative to effect release of the brake (not shown) in response to energization of the switch, and which renders the brake control system inoperative to effect setting of the brake, when the switch is deenergized. As a result of this type configuration, a certain degree fail-safe operation is achieved, since the brake remains in a set position until the brake control system is energized and rendered operative in response to energization supplied by the brake control system 10. In addition, the brake would ordinarily be of the spring loaded variety which remains in a set position until specifically released by operation of the brake control system in response to energization supplied by the electronic control system.

However, referring in more detail to the prior art system and its mode of operation, it may be seen that in certain instances, an electronic failure may occur with possibly disastrous results, as will be explained in detail. More particularly, the electronic system 10 is generally coupled to a source of power 16 such as a conventional 110/115 volt, 60 hz a.c. power source, and is serially coupled to the switch 14, through the power terminals of a triac 18 which supplies energizing signals to the switch 14 when in a conductive state and which prevents the application of energizing signals to the switch 14 when in a non-conductive state. The triac includes a gate electrode 20 which controls the conduction thereof. The gate electrode is coupled to the power supply 16 through a gate resistor 22 and a selectively operable switch 24. The switch 24 prevents the application of gate signals to the gate of the triac, when in an open condition and effects the application of gate signals to render the triac conductive in response to closure. Hence, in order to render the brake control system 12 operative and effect release of the brake the switch 24 is closed which results in the application of a gate signal triggering the triac and rendering it conductive, permitting energizing signals to flow from the power supply 16 through the triac power terminals and through the switch 14. As shown, the switch means 14 comprises a relay coil 26, which is operatively connected to a pair of relay contacts 28 which in turn, are directly connected to the brake control system 12. Upon energization of the relay coil 26, closure of the relay contacts is effected and the brake control system is rendered operative to cause release of the brake. Similarly, opening of the switch means 24 removes the triggering signal from the gate 20 of triac 18, rendering the triac non-conductive, when the applied a.c. power signal passes through the next zero level. The non-conductive triac prevents the flow of energizing signals through the relay coil 26 and causes consequent opening of the relay contacts 28, rendering the brake system inoperative and causing the brake to be set. Thus, it may be readily seen that a certain degree of fail-safe operation is achieved, since ordinarily a failure in the electronic system would apparently merely prevent energizing signals from being applied through the relay coil 26 and thus, prevent the brake control system 12 from being rendered operative so that the brake would remain set.

However, although failure of semiconductor switching devices, such as triacs, are extremely rare, the type of failure which ordinarily occurs is an internal short circuit. As a result, an anode to cathode short circuit could occur in the triac 18. Upon the occurrence of such a short circuit an energizing signal would be applied from the power source 16 through the relay coil 26 regardless of the position of the switch 24. Thus, the brake system would remain continually operative and the brake would consequently remain in a released state. Such an effect could result in a disaster, particularly in situations involving the control of the position of relatively heavy loads such as in the industrial crane or hoist industry.

In order to avoid the possibility of such an occurrence, a system may be provided in accordance with the principles of the present invention, as illustrated in FIG. 2. In the embodiment illustrated in FIG. 2, essentially complete fail-safe operation is achieved since the system is arranged such that an electronic failure caused by an internal short circuit results in rendering the brake control system inoperative thereby effecting setting of the brake. More particularly, the embodiment illustrated in FIG. 2 includes an electronic control system 30 coupled to a brake control system 32. The brake control system 32 may be similar to the brake control system 12 in that the brake (not shown) is released when the brake control system is rendered operative, but is suitably spring-loaded to remain in a set position, when the brake control system is inoperative. Such a safety feature in the brake control system is, of course, common in brake control systems, since it is desired to maintain the brake set in the event of the occurrence of a failure in the electronic control system. However, the electronic control system 30 is quite different in structure and operation from the electronic system 10 and achieves fail-safe operation even in the event of an electronic failure as will be now described in detail.

The electronic system 30 is also coupled to a source of power 34, such as a conventional 110/115 volt, 60 hz power source. The source of power 34 is coupled to a selectively energizable switch means 36 preferably comprising a selectively energizable relay coil 38 operatively connected to a pair of relay contacts 40 which are connected to the brake control system 32. The brake control system 32 may be similar to the brake control system 12, as previously explained, in that it is rendered operative to effect release of the brake in response to the application of an energizing signal thereto, such an energizing signal being provided in response to closure of the relay contacts 40 as a result of the supply of an energizing signal through the relay coil 38. Similarly, the brake control system 32 is rendered inoperative and the brake is set in the absence of an energizing signal upon opening of the relay contacts 40 due to the absence of energizing signals supplied through the relay coil 38. Control of the supply of energizing signals through the relay coil 38 is effected by the provision of a first a.c. switch means 42 having a control element 43. The first a.c. switch 42, is serially connected between the source of power 34 and the relay coil 38 for rendering the brake control system operative. In addition, a second a.c. switch 44 is provided having a control element 45. The second a.c. switch 44 is connected in shunt across the relay coil 38 and across the output end of the first a.c. switch 42 for selectively shunting signals from the relay coil 38 in order to render the brake system inoperative. Control of the conduction of the first a.c. switch 42 and the second a.c. switch 44 is effected by the provision of a selectively operable switch control means 46, which is selectively coupled to the control elements of first and second a.c. switches for controlling the conduction thereof and hence rendering the brake system respectively operative and inoperative. In addition, a current limiting means 48 is serially connected between the source of a.c. power 34 and the selectively energizable switch means 36 and is adapted to interrupt the a.c. power flow to render the brake system inoperative, when one of the a.c. switches 42, 44 is rendered conductive and the other remains conductive in the absence of an energizing signal applied to its associated control element.

More particularly, the first a.c. switch 42 preferably comprises a triac arranged in the system such that its power terminals serially connect the a.c. power source 34 and the relay coil 38, when the triac is in a conductive state. The control element 43 comprises the gate electrode of the triac which is coupled to the opposite side of the power supply 34 through a gate resistor 50. Similarly, the second a.c. switch 44 also preferably comprises a triac but the power terminals of the triac 44 are connected in shunt across the relay coil 38 for shunting a.c. power signals from the power supply 34 and preventing the flow of power to the relay coil 38, when the triac 44 is rendered conductive. The control element 45 of the triac 44 comprises its gate electrode, which is connected to the opposite side of the power supply through a gate resistor 52. Control of the conduction of the triacs 42, and 44, is effected by the selectively operable switch control means 46 preferably comprising a multi-position contact member, which may be coupled to an external mechanical dial (not shown) or other such mechanism for controlling its position. The contact member 46 is coupled to the power supply 34 through the current limiting means 48 by a voltage dropping resistor 54. In the illustrated embodiment, contact member 46 is selectively movable between a first position at which it is in contact with the gate 43 and supplies energizing signals from the power supply to the gate 43 of triac 42 in order to render the brake system 32 operative and cause release of the brake and a second position at which it is in contact with the gate electrode 45 of triac 44 so that it applies energizing signals from the power supply to the gate 45 to render the triac 44 conductive and thereby cause the shunting of signals from the relay coil 38, rendering the brake system inoperative and to effect setting of the brake.

The current limiting means 48 preferably comprises a fuse having a preselected current limit. The fuse 48 thus effects interruption of the a.c. power flow in the circuit whenever this preselected current limit is exceeded. Such an event occurs when one of the triacs 42 and 44 is rendered conductive due to the application of a trigger signal to its gate, while the other triac remains in a conductive state, since in the illustrated embodiment, the triacs 42 and 44 are arranged to be alternatively conductive. Consequently, in the presence of an electrical fault, such as an internal short circuit, across the power terminals of one of the triacs, whereby it remains in a conductive or energized state in the absence of the application of a trigger signal to its gate electrode, the preselected current limit is exceeded and the fuse 48 functions to disrupt the power flow as soon as the other triac is rendered conductive due to appropriate positioning of contact member 46 or in the event of a similar electrical failure. The preselected current limit is exceeded under such circumstances since triacs 42 and 44 would define a series circuit with the power supply and the fuse but would provide essentially no electrical resistance resulting in a abrupt current surge which would exceed the limit of the fuse.

Referring in detail to the operation of the system illustrated in FIG. 2, when the movable contact member 46 is in the brake release position, as shown in FIG. 2, a trigger signal is applied to the gate 43 of triac 42 rendering the triac 42 conductive, while triac 44 remains non-conductive. The triac 42 thus effects the application of energizing signals through the selectively energizable relay coil 38 causing closure of the contacts 40 and renders the brake control system operative to cause release of the brake. Similarly, when the movable contact member 46 is moved to the set position, i.e., in contact with gate 45, trigger signals are removed from the gate 43 of triac 42 which is thus rendered non-conductive when the applied a.c. power signal passes through its next zero level, while the application of a trigger signal to the gate 45 of triac 44 renders triac 44 conductive so as to cause shunting of the relay coil 38. In this regard, it may be noted that the traic 42 while non-conductive of course serves to block the flow of a.c. signals to the relay coil 38 and similarly the triac 44, while conductive, shunts such signals even if triac 42 were to remain conductive due to an electrical fault so as to assure immediate removal of energizing signals from the relay coil 38. The disruption of the flow of power through coil 38 in response to conduction of triac 44 when the movable contact member is in the set position, effects opening of the contacts 40, rendering the brake control system inoperative and thus effecting setting of the brake. In addition, as previously explained, in accordance with an important feature of the present invention, the fuse 48 is arranged to interrupt the a.c. power flow to prevent the application of energizing signals to the relay coil 38 and thus, render the brake system inoperative, whenever the movable member 46 is connected to the control element of one of the triacs and the other triac remains in an energized or conductive state in the absence of the application of trigger signals to its gate electrode. In this regard, it should be noted that when triac 42 and triac 44 are both in an energized state, a relatively large signal passes through the fuse 48, the power of terminals of triac 42, and the power terminals of the triac 44. Such a signal is in excess of the capacity of the fuse 48 causing the fuse 48 to blow and thus disrupt the a.c. power flow in the circuit 30, rendering the brake control system 32 inoperative and effecting setting of the brake. Thus, fail-safe setting of the brake results whenever there is an electrical failure in the circuit 30 such as may result from an internal electrical short circuit in either triac 42 or triac 44 or in both triacs. Accordingly, whenever the movable member 46 is in the set position whereby triac 44 is rendered conductive to shunt the relay coil 38 the brake system is rendered inoperative even if there has been an electrical failure, such as an internal short circuit, in the triac 44 or triac 42. In this regard, when the movable member 46 is in the set position, and triac 44 is subject to an internal electrical short circuit, it remains in an energized state, when the movable member 46 is positioned in the release position and accordingly both triacs are conductive, resulting in an electrical signal through fuse 48 in excess of its limit, causing the fuse to blow and disrupt the a.c. power signal. Similarly, if triac 42 remains conductive due to an internal electrical short circuit or the like, when the movable member 46 is positioned in the set position, both triacs 42 and 44 are energized and the fuse blows. Of course, if both triacs 42 and 44 are electrically short circuited and remain in an energized state, the fuse similarly blows. Thus, it may be seen that in all instances when either one or both of the triacs are subject to electrical failure, the brake system may be nevertheless rendered inoperative to effect setting of the brake. Consequently, it may be seen that a totally fail-safe brake control system is provided, which operates to render the brake control system 32 inoperative and hence effect setting of the brake whenever trigger signals are applied to the gate electrode of one of the triacs to effect energization thereof and the other remains in an energized state in the absence of the application of an energizing signal to its gate electrode so that assurance is provided of fail-safe control of the setting of the brake.

Thus, an improved electronic system for effecting fail-safe control of the operation of a brake control system has been described in which setting of the brake is permitted even in the event of an electrical failure within the electronic control system.

Various changes and modifications in the above-described invention will be readily apparent ot one skilled in the art and such changes and modifications are deemed to be within the spirit and scope of the invention as set forth in the appended claims.

What is claimed is:

1. An electronic system for controlling a selectively operable control system comprising a selectively energizable switch coupled to the control system for rendering the control system operative in response to the energization of said switch, a first power switch serially connected between a source of power and said selectively energizable switch to supply energizing signals thereto and render said control system operative, said first power switch including a control element adapted to render said first power switch conductive only in response to the application of a trigger signal to said control element, a second power switch connected in shunt with said selectively energizable switch and with said first power switch for shunting energizing signals from said selectively energizable switch and rendering said control system inoperative, said second power switch including a control element adapted to render said second power switch conductive only in response to the application of a trigger signal to said control element, a switch control means for selectively applying trigger signals either to said control element of said first power switch or to said control element of said second power switch to render said control system operative and inoperative respectively, and a current interrupting means serially connected between the source of power and the selectively energizable switch for disrupting the supply of power to said selectively energizable switch and rendering the control system inoperative responsive to concomitant conduction of said first and second power switches when said switch control means applies trigger signals to the control element of only one of said first and second power switches and the other of said power switches remains in a conductive state in the absence of the application of a trigger signal to its control element.

2. An electronic system in accordance with claim 1 wherein said selectively energizable switch comprises a relay, including a selectively energizable relay coil coupled to said first power switch and to said second power switch and including a pair of associated relay contacts operatively connected to said relay coil and adapted to be closed in response to energization of said relay coil and opened in response to de-energization of said relay coil, and relay contacts being connected to said control system for rendering said control system operative in response to the closure thereof, and inoperative in response to the opening thereof.

3. An electronic system in accordance with claim 2 wherein said first and second power switches respectively comprise first and second triacs, said control elements comprise the respective gate electrodes thereof, and said switch control means comprises a movable contact member for selectively connecting each of said gate electrodes to a source of power to render its associated triac conductive in order to energize and deenergize said relay coil.

4. An electronic system in accordance with claim 3 wherein said current interrupting means comprises a fuse having a preselected current limit, said fuse being coupled between said selectively movable contact member and the source of power for disrupting the flow of trigger signals between the source of power and said gate electrodes of said first and second triacs regardless of the position of said movable contact member in response to a current flow through said fuse in excess of said preselected current limit.

5. An electronic system in accordance with claim 3 wherein said current interrupting means comprises a fuse having a preselected current limit, said fuse being serially connected between the source of power and said relay coil for disrupting the flow of power through said relay coil in response to a current flow in excess of said preselected limit, thereby effecting deenergization of said relay coil.

6. An electronic system in accordance with claim 5 wherein said preselected current limit is exceeded in response to concomitant conduction of said first and second triacs.

7. An electronic system for effecting fail-safe control of the operation of a brake control system in which the brake is released when the brake control system is rendered operative and is set when the brake control system is rendered inoperative, the electronic system comprising selectively energizable switch means coupled to the brake control system for rendering said brake control system operative in response to energization of said switch means and inoperative in response to de-energization of said switch means, first a.c. switch means serially connected between a source of a.c. power and said selectively energizable switch means for selectively supplying energizing signals to said selectively energizable switch means to render said brake control system operative, said first a.c. switch means including a control element adapted to render said second power switch conductive only in response to the application of a trigger signal to said control element, second a.c. switch means connected in shunt with said first a.c. switch means and said selectively energizable switch means for selectively shunting energizing signals from said selectively energizable switch means and rendering said brake control system inoperative, said second a.c. switch means including a control element adapted to render said second power switch conductive only in response to the application of a trigger signal to said control element, a selectively operable switch control means connectable to said control element of said first a.c. switch means and to said control element of said second a.c. switch means for respectively supplying trigger signals to said first a.c. switch means or to said second a.c. switch means in order to render said brake control system respectively operative and inoperative, and a current limiting means serially connected between the source of a.c. power and said selectively energizable switch means for interrupting the a.c. power flow and rendering said brake system inoperative responsive to concomitant conduction of said first and second a.c. switch means when said switch control means is connected to said control element of said first a.c. switch means and said second a.c. switch means remains in a conductive state in the absence of the application of a trigger signal to its control element or when said switch control means is connected to said control element of said second a.c. switch means and said first a.c. switch means remains in a conductive state in the absence of the application of a trigger signal to its control element.

8. An electronic system in accordance with claim 7 wherein said selectively energizable switch means comprises a relay including a selectively energizable relay coil electrically connected in series with said first a.c. switch means and in parallel with said second a.c. switch means and including a pair of relay contacts operatively connected to said relay coil, and relay contacts being coupled to said brake control system and adapted to be closed in response to energization of said relay coil for rendering said brake control system operative, and opened in response to deenergization of said relay coil rendering said brake control system inoperative.

9. An electronic system in accordance with claim 8 wherein said first and second a.c. switch means respectively comprise first and second triacs, said control elements comprise the respective gate electrodes of said triacs, said selectively operable switch control means comprises a multiposition contact member for selectively separately coupling each of said gate electrodes to the source of a.c. power to effect the application of a trigger signal thereto so as to selectively render the associated triac conductive in order to energize and deenergize said relay coil.

10. An electronic system in accordance with claim 9 wherein said current interrupting means comprises a fuse having a preselected current limit serially connected between the source of power and said relay coil for interrupting the power flow through said relay coil in response to a current flow in excess of said preselected limit, said fuse being subjected to a current flow in excess of said preselected limit in response to simultaneous conduction of said first triac and said second triac.

* * * * *